Feb. 5, 1924.

I. MARINO

AUTOMOBILE TURNTABLE 1,482,937

Filed May 24, 1923 2 Sheets-Sheet 1

Inventor
I. Marino

By
J. R. Bryant
Attorney

Feb. 5, 1924.

I. MARINO 1,482,937

AUTOMOBILE TURNTABLE

Filed May 24, 1923    2 Sheets-Sheet 2

Inventor
I. Marino

Patented Feb. 5, 1924.

1,482,937

UNITED STATES PATENT OFFICE.

IGNAZIO MARINO, OF WASHINGTON, DISTRICT OF COLUMBIA.

AUTOMOBILE TURNTABLE.

Application filed May 24, 1923. Serial No. 641,224.

*To all whom it may concern:*

Be it known that I, IGNAZIO MARINO, a subject of the King of Italy, residing at Washington, in the District of Columbia, have invented certain new and useful Improvements in Automobile Turntables, of which the following is a specification.

This invention relates to new and useful improvements in turntables for lifting automobiles and aims to provide a device capable of simultaneously lifting all of the wheels of the vehicle clear of the ground.

An important object of this invention is to provide a device of the above mentioned character which is adapted for being permanently secured to the chassis of an automobile with the controlling or operating portion of the same conveniently positioned within the body so that a person may actuate the mechanism while within the car.

A further object of this invention is to provide a turntable for an automobile which may be employed as a jack to enable a person to change tires, to make repairs underneath the car in a sitting rather than a reclining position, for retaining the weight of the car off of the tires during winter storage, and for many other similar advantages.

A further object of the invention is to provide a turntable mechanism which will permit an automobile to be turned to point or head in any desired direction within a space equal to the length of the car, thereby affording great convenience in handling the same in small spaces such as garages, show rooms, and the like.

A still further object of the invention is to provide a device which may be employed, when a car is mired or stuck in a mud hole, for raising the wheels clear of the ground to allow a person to place planks or other firm material therebeneath so that the machine may obtain traction sufficient to permit it moving out of the trouble zone.

Other objects and advantages of the invention will be apparent during the course of the following description.

Figure 1:
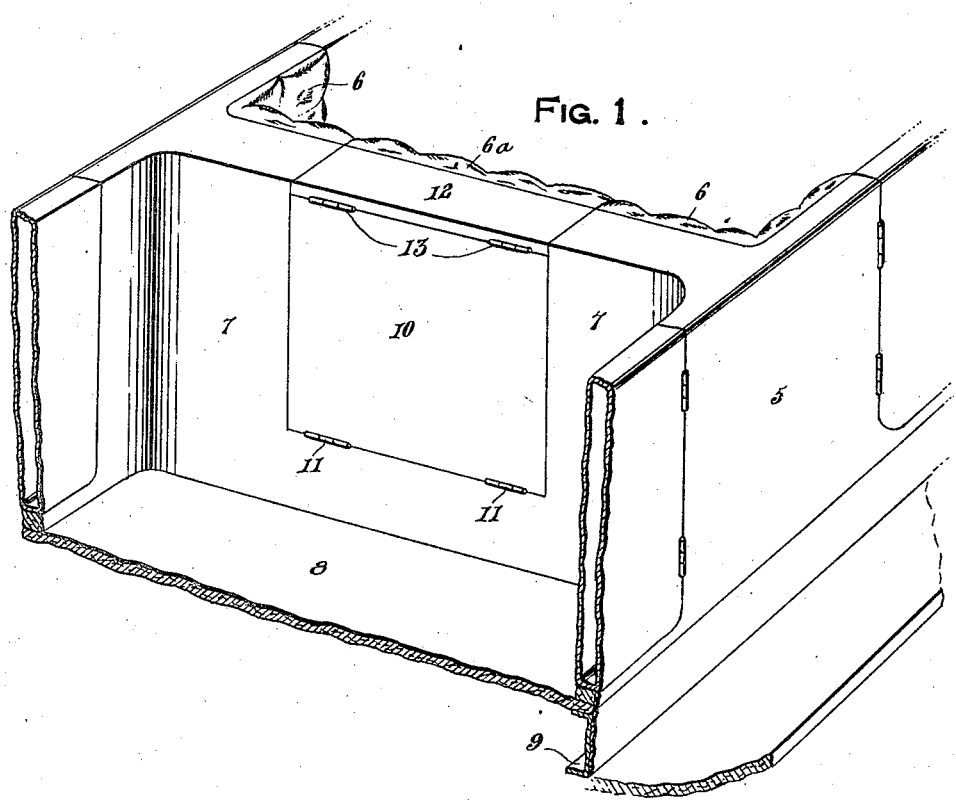
Figure 2:
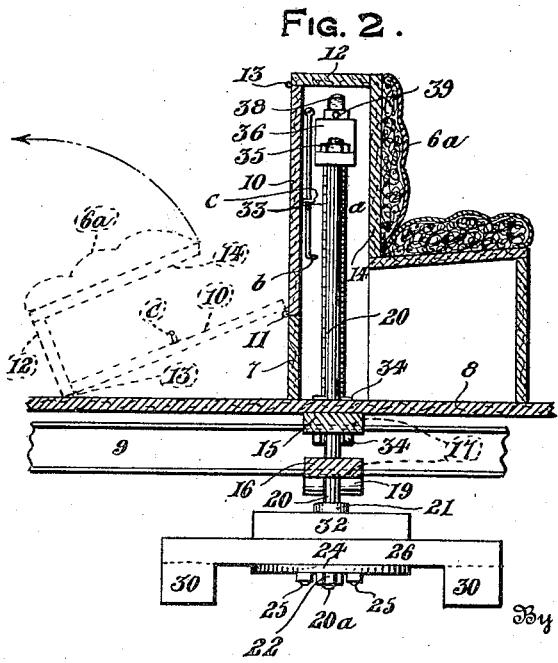
Figure 3:
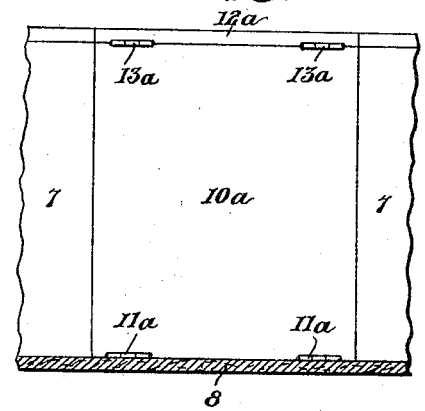
Figure 4:
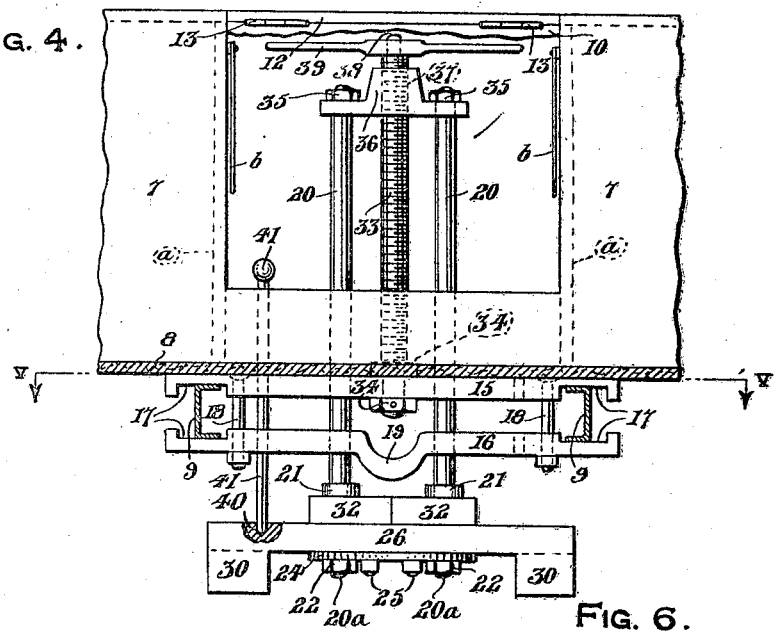
Figure 5:
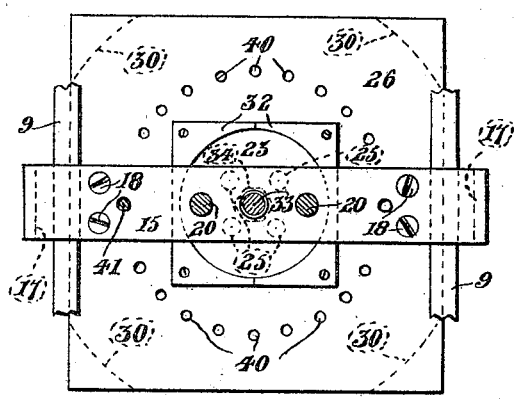
Figure 6:
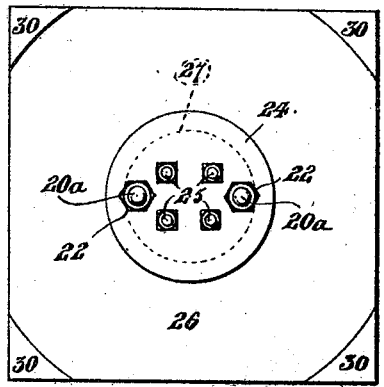
Figure 7:
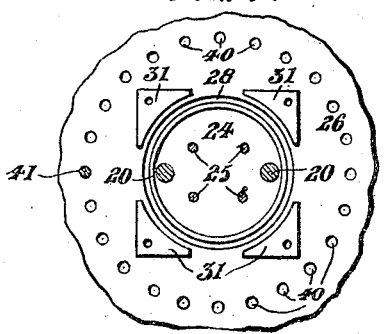
Figure 8:
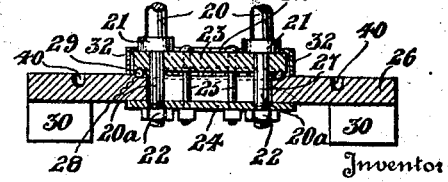

In the accompanying drawings forming a part of this specification and in which like numerals are employed to designate like parts throughout the same, Figure 1 is a fragmentary perspective view of an automobile body showing the convenient manner of mounting of the operating or controlling portion of the mechanism within the back portion of the front seat, Figure 2 is a vertical sectional view, partly in elevation, and shows the arrangement of the controlling or actuating portion of the mechanism within the back of the front seat, and shows in dotted lines the position of a portion of said seat and back moved to a convenient position for allowing access to said controlling mechanism, Figure 3 is an elevational view, partly in section, of a slightly modified form of seat back construction which permits convenient access to the controlling or operating portion of the mechanism, Figure 4 is an elevational view partly in section and partly broken away, of the turntable mechanism embodying this invention, Figure 5 is a plan view of the base portion of the turntable and the attaching mechanism for securing the device to an automobile chassis frame, and shows the guiding rods and actuating screw in horizontal cross-section, Figure 6 is a bottom plan view of the bottom plate or base of the turntable, Figure 7 is a fragmentary top plan view of a portion of the bottom plate or base of the turntable with a portion of the actuating mechanism removed, and Figure 8 is a vertical sectional view, partly in elevation, of the bottom plate or base and shows the actual construction which permits the rotating or turning of the car body.

Referring to the accompanying drawings and particularly to Figs. 1 to 4 inclusive, there is shown an automobile body 5 having a suitable front seat 6 formed therein which is supported by the back 7 as shown, there being further provided the car floor 8 which is suitably secured in any well known manner to the side frame bars 9 which constitute a portion of the automobile chassis frame. In the construction of the front seat 6 and back 7 in the form shown in Figs. 1, 2 and 4, there is provided a panel portion 10 which is hingedly connected at 11 to a solid portion of the seat back 7 while a strip 12 forming a portion of the top of the front seat back is hingedly connected at 13 to the said panel 10. Suitably secured to the front edge of this top strip 12 is a perpendicular panel 14 to which is secured a removable section 6ª of the front seat cushion 6. By inspecting Fig. 2 it will be seen that the panel 10, top strip 12, panel 14, and seat cushion section 6ª may be moved into their dotted line positions as shown for permitting convenient access to the turntable operating or actuating mechanism positioned within these said elements. This dotted line position merely shows the entire combination of elements hinged at 11, it will be seen, however, that the top strip 12, panel section 14, and seat cushion 6ª may be hinged at 13 in the direction of the arrow line to further move these elements from the said controlling mechanism. This chamber or compartment is closed on opposite ends by means of partitions "a" to which are secured hooks "b" adapted for engaging eye bolts "c" secured to the inner face of the movable panel 10 for the purpose of allowing the removable section of the seat and back to be supported off of the floor 8.

By inspecting Fig. 3 of the drawing it will be seen that a slightly modified form of seat back is shown. This form merely consists of providing a removable back panel 10ª which is of the same height as the back 7 and is hingedly connected at 11ª to the floor boards 8. The top strip 12ª is hingedly connected to this panel member 10ª at 13ª in substantially the same manner as the form shown in Figs. 1, 2 and 4. It is to be understood that a panel 14 and cushion section 6ª is provided with this modified form of the invention and is of identical construction with the other forms described above.

Referring particularly to Figs. 2 and 4 to 8 inclusive wherein the turntable mechanism is clearly illustrated, it will be seen that there are provided upper and lower clamping bars 15 and 16 respectively which are employed for securing the said mechanism to the side frame bars 9 which form a portion of the automobile chassis. Both of the bars 15 and 16 are provided with cutout portions 17 adjacent their outer ends for the purpose of receiving the said frame bars 9 positioned therein. It will be seen that by employing the bolts and nuts 18 which extend through suitable openings formed in the said bars 15 and 16, that the mechanism may be securely clamped to frame bars of different dimensions. The lower clamping bar 16 is provided with an arcuately-shaped offset portion 19 which affords clearance space for the drive shaft of the automobile.

Vertically, slidably associated with the floor boards 8 and clamping bars 15 and 16 are guiding rods 20 which are provided with reduced portions 20ª at their lower ends that are adapted for receiving the blocks 21 and removable nuts 22 for the purpose of connecting the upper turntable plate 23 and lower clamping plate 24 thereto. There are further provided a series of clamping bolts 25 which are provided for connecting the said upper turntable plate 23 and clamping plate 24 to the bottom plate or base 26 as best shown in Fig. 8. This bottom plate or base is provided with a centrally positioned circular aperture or opening 27 which is adapted for permitting the rotation of the reduced ends 20ª of the guiding bars 20 and the clamping bolts 25 therein. The undersurface of the upper turntable plate 23 and the upper surface of the bottom plate or base 26 are provided with suitable circular ball races 28 for receiving the ball bearings 29 positioned therewithin to provide a suitable anti-friction mounting for the upper turntable plate 23 upon the said base 26. This bottom plate or base 26 is provided at its four corners with bosses or lugs 30 that are intended to engage the ground when the said base 26 is moved downwardly in a manner to be described at a later point. It will be seen by this construction that the bottom plate or base 26 is rotatably associated with the upper turntable plate 23, clamping plate 24, clamping bolt 25, and the reduced ends 20ª of the guiding rods 20. Referring particularly to Figs. 5, 7 and 8 there are shown block members 31 which are secured to the bottom plate or base 26 in such a manner as to form the four corners of a square and are adapted for having secured thereto the two-part dust guard 32 as shown. This provision of a dust guard will enable the ball races 28 and ball bearings 29 to be kept comparatively free from dust or other foreign matter.

The means employed for vertically moving this turntable portion of the construction and the supporting rods 20 comprises a threaded feeding member or screw 33 which is rotatably secured to the upper clamping bar 15 by means of lock nuts 34 which are positioned one upon each side of the said clamping bar thereby preventing relative longitudinal movement of the said screw 33 in respect to the said clamping bar, but permitting rotary movement of the said clamping screw. Secured to the upper ends of the guiding bars 20, as by means of the nuts 35, is a block 36 which is provided with a vertically extending internally threaded bore 37 which operatively engages the said screw 33. The extreme upper end of this screw 33 is squared or provided with at least one flat surface, as at 38 for removably receiving a cross bar 39 which is employed for rotating the said screw 33. It will be seen that this construction will cause the guide bars 22 with the turntable portion of the mechanism to be moved either upwardly or downwardly in respect to the car body and clamping bars 15 and 16 when the operating screw 33 is rotated in the proper direction.

The upper surface of the bottom plate or base 26 is provided with a series of annularly arranged recesses 40 which are adapted for receiving the lower end of the locking bar 41 therein. This bar extends through suitable openings provided in the floor boards 8, and clamping bars 15 and 16 as best shown in Figs. 4 and 5. It will be seen by this construction that the positioning of the locking bar 41 within the openings formed in the floor and clamping bars and the bottom plate or base 26 that relative rotary movement of these elements will be prevented. The removal of this clamping bar will, however, permit such rotary relative movement.

The operation of the device is as follows:—

During such periods when the car is employed in the usual manner for traveling over the ground or in temporary or overnight storage in a garage, the turntable mechanism is actuated for causing the same to assume the position as best shown in Figs. 2 and 4. In other words, the bottom plate or base 26 is retained in position in close proximity to the floor boards 8 and chassis frame bars 9. When the operator of the vehicle desires to elevate the car for repair purposes or for reversing the direction of travel of the same, the front seat cushion 6ᵃ and the other movable elements associated therewith are moved into the dotted line position as shown in Fig. 2 thereby allowing ready access to the cross bar or operating means 39. The operator of the vehicle then rotates the screw 33 by means of this bar 39 for causing the guiding rods 22 to move downwardly in respect to the body of the car. As stated heretofore the threaded connection between this screw 33 and the block 36 causes this movement of the said bars 20. The operation of the cross bar 39 is continued until the lugs or foot portions 30 carried by the bottom plate or base 26 have engaged the ground and the entire automobile has been elevated a proper distance for permitting the requisite operation to be performed. Should the operator desire to reverse the direction of the automobile, the locking bar 41 is removed after the car has been elevated to the height desired. The turntable construction best shown in Fig. 8 will permit relative rotary movement between the automobile and the bottom plate or base 26 and naturally between the automobile body and the ground. After the said automobile has been rotated as far as desired, the locking bar 41 is again inserted into the vertically alining opening 40 positioned directly therebelow. Further relative rotary movement of the automobile and the ground plate is thereby prevented. It will be seen that by reversely rotating the feeding screw 33 that the turntable portion of the mechanism will again be returned to the position shown in Figs. 2 and 4. The car may then proceed in the general direction in which it is now headed.

It is to be understood that I do not desire to limit myself to the exact construction of the back for the front seat as any desired construction may be employed which will enable a person to gain access to the operating portion of the mechanism.

It is to be understood that the forms of this invention herewith shown and described are to be taken as preferred examples of the same, and that various changes in the shape, size and arrangement of parts may be resorted to without departing from the spirit of the invention or the scope of the subjoined claims.

Having thus described the invention, I claim:—

1. The combination with an automobile, of a base, a plate rotatably secured to said base, posts secured to said plate, means for movably securing said posts to said automobile, and means for causing relative vertical movement between said base and said automobile.

2. The combination with an automobile, of a base, a plate rotatably secured to said base, posts secured to said plate, means for movably securing said posts to said automobile, means for causing relative vertical movement between said base and said automobile, and means for selectively preventing relative rotary movement between said base and said plate.

3. The combination with an automobile, of a ground engaging base, a plate rotatably secured to said base, anti-friction means positioned between said base and plate, posts secured to said plate, means for movably securing said posts to said automobile, and means for causing relative vertical movement between said base and said automobile.

4. The combination with an automobile, of a ground engaging base, a plate rotatably secured thereto, posts secured to said plate, means for movably securing said posts to said automobile, and means for causing relative vertical movement between said plate and said automobile.

5. The combination with an automobile, of clamping bars secured thereto, vertical posts movably carried by said bars, a plate secured to said posts, a base rotatably secured to said plate, and means associated with said bars and said posts for causing relative vertical movement between said plate and said automobile.

6. The combination with an automobile, of clamping bars secured thereto, vertical posts movably carried by said bars, a plate secured to said posts, a base rotatably secured to said plate, means associated with said bars and said posts for causing relative vertical movement between said plate and said automobile, and means for selectively preventing relative rotary movement between said base and said plate.

7. The combination with an automobile provided with a seat construction and having a section removably formed therein, of clamping bars secured to the frame of said automobile, posts movably carried by said bars, a plate secured to said posts, a base rotatably secured to said plate, and means secured to said bars operatively connected to said posts and positioned within the space enclosed by said removable seat section for causing relative vertical movement between said automobile and said base.

8. The combination with an automobile provided with a seat construction having a section foldably, removably formed therein, of clamping bars removably secured to the frame of said automobile, posts vertically movably carried by said bars, a plate secured to said posts, a base rotatably secured to said plate, and means secured to said bars operatively connected to said posts and positioned within the space enclosed by said removable seat section for causing relative vertical movement between said automobile and said base.

9. The combination with an automobile, of a pair of bars removably secured to the frame of said automobile, posts movably carried by said bars, a plate secured to said posts, a base having a series of annularly arranged recesses rotatably secured to said plate, means for causing relative vertical movement between said base and said automobile for raising or lowering the latter bodily in respect to the ground, and means for selectively preventing relative rotary movement between said base and plate.

10. The combination with an automobile, of a pair of bars removably secured to the frame of said automobile, posts movably carried by said bars, a plate secured to said posts, a base having a series of annularly arranged recesses rotatably secured to said plate, means for causing relative vertical movement between said base and said automobile for raising or lowering the latter bodily in respect to the ground, and means for selectively preventing relative rotary movement between said base and plate, said first mentioned means comprising a locking bar vertically, movably associated with the bars secured to said automobile adapted for selectively occupying one of said recesses formed in said base.

In testimony whereof I affix my signature.

IGNAZIO MARINO.